US011873642B2

(12) United States Patent
Hunsaker

(10) Patent No.: US 11,873,642 B2
(45) **Date of Patent: *Jan. 16, 2024**

(54) FIRE RESISTANT CONSTRUCTION BLOCK

(71) Applicant: Old Mill Brick LLC, Bluffdale, UT (US)

(72) Inventor: Garrick Hunsaker, Bluffdale, UT (US)

(73) Assignee: Old Mill Brick LLC, Bluffdale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,070

(22) Filed: Dec. 14, 2022

(65) Prior Publication Data

US 2023/0220664 A1 Jul. 13, 2023

Related U.S. Application Data

(63) Continuation of application No. 17/328,272, filed on May 24, 2021, now Pat. No. 11,549,259, which is a continuation of application No. 16/828,714, filed on Mar. 24, 2020, now Pat. No. 11,015,339.

(60) Provisional application No. 62/823,380, filed on Mar. 25, 2019.

(51) Int. Cl.
*E04B 1/94* (2006.01)
*E06B 1/00* (2006.01)

(52) U.S. Cl.
CPC .............. *E04B 1/944* (2013.01); *E06B 1/003* (2013.01)

(58) Field of Classification Search
CPC . E04B 1/944; E06B 1/003; E04C 1/40; E04C 1/41; E04C 2/288
See application file for complete search history.

(56) References Cited

U.S. PATENT DOCUMENTS 1,432,222 A * 10/1922 Vail ........................... E04B 2/14 52/204.2
2,087,541 A 7/1937 Koester
3,940,549 A 2/1976 Whittum et al.
(Continued)

FOREIGN PATENT DOCUMENTS

WO 2020198241 A1 10/2020

OTHER PUBLICATIONS

Extended European Search Report dated Nov. 7, 2022 received in European patent application No. 20777556.0.
(Continued)

*Primary Examiner* — Rodney Mintz
(74) *Attorney, Agent, or Firm* — Dorsey & Whitney LLP

(57) ABSTRACT

A fire resistant construction block that comprises a core comprising a polygonal shape including a front face, a rear face, a right face, a left face, a bottom face, and a top face. The fire resistant construction block further comprises a fire resistant coating surrounding at least a portion of the core and an optional intermediate layer disposed between the core and the fire resistant coating. The fire resistant construction block can comprise a plurality of channels, and the top face of the fire resistant construction block comprises a sloped surface. The fire resistant construction block can be configured to be disposed above a window of a building and the placement of the fire resistant construction block can enable an exterior wall of a building to comply with a National Fire Protection Agency Code 285 standard fire test method and/or other fire test standards.

20 Claims, 10 Drawing Sheets

(56) References Cited

U.S. PATENT DOCUMENTS

| | | | | |
|---|---|---|---|---|
| 4,186,536 | A | 2/1980 | Piazza | |
| 4,331,726 | A | 5/1982 | Cleary | |
| 5,191,744 | A | 3/1993 | Bowes | |
| 5,245,810 | A | 9/1993 | Foss | |
| 5,551,195 | A | 9/1996 | Vanderstukken | |
| 7,677,007 | B2 | 3/2010 | Parker | |
| 8,887,469 | B2 | 11/2014 | MacDonald et al. | |
| 9,145,676 | B2 | 9/2015 | Long et al. | |
| 9,267,260 | B2 | 2/2016 | MacDonald et al. | |
| 9,309,667 | B2 | 4/2016 | Thompson et al. | |
| 9,359,811 | B2 | 6/2016 | Hughes et al. | |
| 9,598,891 | B2 * | 3/2017 | Knoblauch | E04B 1/355 |
| 9,963,875 | B1 | 5/2018 | Prygon | |
| 11,015,339 | B2 | 5/2021 | Hunsaker | |
| 11,549,259 | B2 * | 1/2023 | Hunsaker | E06B 1/003 |
| 2006/0272264 | A1 | 12/2006 | Parker | |
| 2012/0096785 | A1 | 4/2012 | Weeks | |
| 2012/0260603 | A1 | 10/2012 | Thompson et al. | |
| 2013/0067845 | A1 | 3/2013 | MacDonald et al. | |
| 2013/0111842 | A1 | 5/2013 | Long et al. | |
| 2014/0318035 | A1 | 10/2014 | Costa | |
| 2015/0096257 | A1 | 4/2015 | Sinnathamby et al. | |
| 2016/0281413 | A1 | 9/2016 | Knoblauch et al. | |
| 2017/0067248 | A1 | 3/2017 | Vairo et al. | |
| 2020/0032513 | A1 | 1/2020 | Devito | |
| 2020/0308829 | A1 | 10/2020 | Hunsaker | |
| 2021/0062502 | A1 * | 3/2021 | Archer | E04B 1/944 |
| 2022/0010551 | A1 * | 1/2022 | Hunsaker | E06B 1/003 |
| 2022/0074204 | A1 | 3/2022 | Gray | |
| 2022/0136236 | A1 | 5/2022 | O'Meara | |

OTHER PUBLICATIONS

International Search Report and Written Opinion dated Jun. 19, 2020 for international application PCT/US2020/024490.

Notice of Allowance dated Feb. 23, 2021 for U.S. Appl. No. 16/828,714.

Notice of Allowance dated Sep. 14, 2022 received in U.S. Appl. No. 17/328,272.

Office Action dated May 23, 2022 for U.S. Appl. No. 17/328,272.

* cited by examiner

FIRE RESISTANT CONSTRUCTION BLOCK

RELATED APPLICATIONS

This application is a continuation of U.S. patent application Ser. No. 17/328,272, filed May 24, 2021, and titled FIRE RESISTANT CONSTRUCTION BLOCK, which is a continuation of U.S. patent application Ser. No. 16/828,714, filed Mar. 24, 2020, and titled FIRE RESISTANT CONSTRUCTION BLOCK, which claims priority to U.S. Provisional Patent Application No. 62/823,380, filed Mar. 25, 2019, and titled FIRE RESISTANT CONSTRUCTION BLOCK, each of which is incorporated herein by reference in its entirety.

TECHNICAL FIELD

The present disclosure relates generally to fire resistant construction blocks, systems, and related methods of use. More specifically, the disclosure relates to fire resistant construction blocks, systems, and related methods that can comply with the National Fire Protection Agency (NFPA) 285 standard fire test method.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
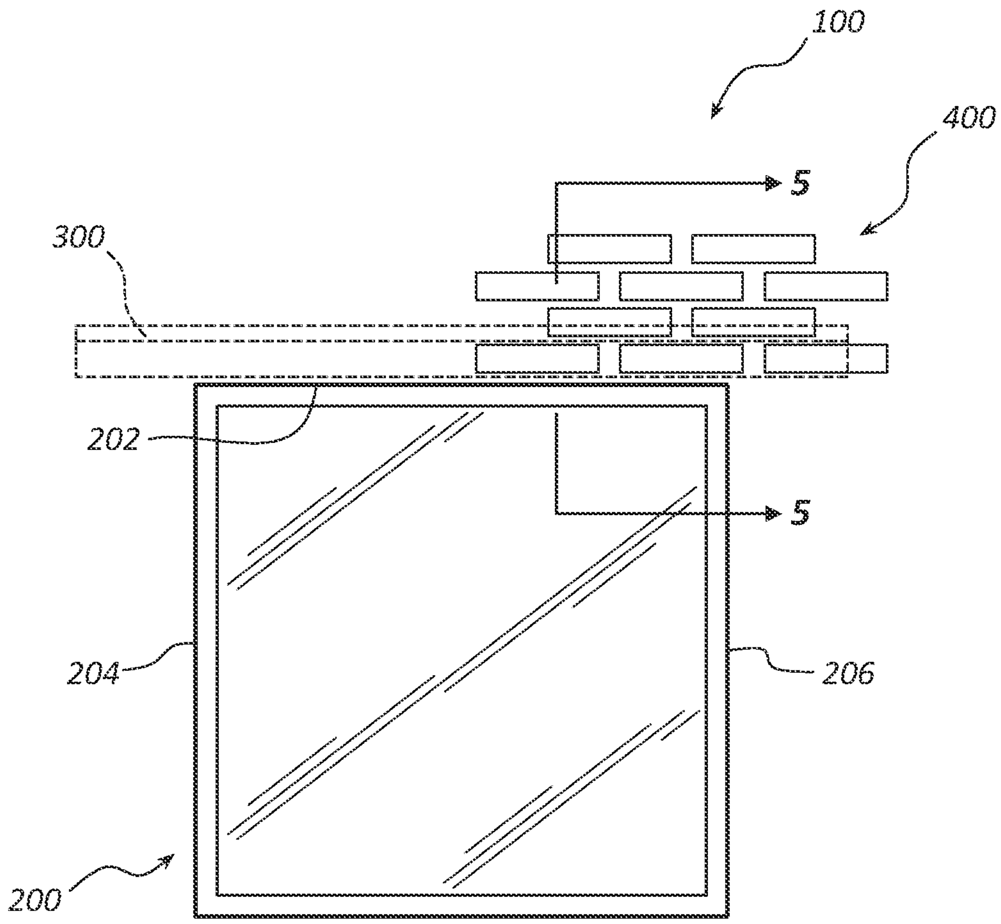
FIG. 1 is a front schematic view of a wall system that includes a fire resistant construction block in accordance with an embodiment of the present disclosure.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

As used herein, the phrases "connected to," "coupled to," and "in communication with" refer to any form of interaction between two or more entities, including, but not limited to, mechanical, electrical, magnetic, electromagnetic, fluid, and thermal interaction. Two components may be coupled to each other even though they are not in direct contact with each other. For example, two components may be coupled to each other through an intermediate component.

The present disclosure relates to fire resistant construction blocks, systems, and related methods of use. As detailed below, the fire resistant construction block can include a core. The block can also include a fire resistant coating that can inhibit or prevent the block from catching fire or combusting during a building fire.

In some embodiments, the fire resistant construction block is employed in a wall system. For example, the block can be employed in a wall system on an exterior of a building structure. Such a system can also be referred to as an exterior wall system. The block can also be employed in interior wall systems if desired. In some embodiments, the block can be configured to help prevent, minimize, or reduce propagation of a fire along the wall system. For example, the block can be disposed above a window structure. In such instances, the block can be configured to help prevent, minimize, or reduce vertical propagation of a fire out the window and vertically up the wall of the building (e.g., from one story to another). In particular embodiments, a wall system (e.g., an exterior wall system) incorporating the block can be configured to comply with the National Fire Protection Agency (NFPA) 285 standard fire test method (e.g., the 2018 and/or 2019 versions of the NFPA 285 Fire Test Standard) and/or other fire testing standards.

NFPA 285 standard fire test method is a test method developed through a consensus process for determining the flammability characteristics of exterior non-load-bearing wall assemblies or panels where the walls are required to be noncombustible. The standard is used to evaluate the fire propagation characteristics of an exterior non-load-bearing wall assembly that is constructed using combustible materials or that incorporates combustible components within the wall assembly. The wall assembly needs to (1) resist flame propagation over the exterior face of the wall assembly; (2) resist vertical flame propagation within the combustible components from one story to the next; (3) resist vertical flame propagation over the interior surface of the wall assembly from one story to the next; and (4) resist lateral flame propagation from the compartment of fire origin to adjacent compartments or spaces. Building fires may propagate vertically through openings, such as windows, so construction materials that are able to meet the NFPA 285 standard fire test method are sought after.

Without limitation, the fire resistant construction blocks, systems, and related methods disclosed herein can comply with the NFPA 285 standard fire test method and/or other fire testing standards. In particular, the fire resistant construction blocks, systems, and related methods can be used to resist one or more of (1) flame propagation over an exterior face of a wall assembly; (2) vertical flame propagation within the combustible components from one story to the next; (3) vertical flame propagation over the interior surface of a wall assembly from one story to the next; and/or (4) lateral flame propagation from the compartment of fire origin to adjacent compartments or spaces.

FIG. 1 illustrates a schematic view of a wall system 100 in accordance with an embodiment of the present disclosure. It will be appreciated that the wall system 100 can be representative of an exterior wall system or an interior wall system. In certain embodiments, the wall system 100 complies with or otherwise meets the NFPA Code 285 standard fire test method (e.g., the 2018 and/or 2019 versions of the NFPA 285 Fire Test Standard) and/or other fire test methods.

As shown in FIG. 1, the wall system 100 includes a fire resistant construction block 300. The block 300 is also coupled or otherwise attached to a building structure. For example, the block 300 can be coupled to a wall (e.g., an exterior wall) of the building structure. In some embodiments, the block can also be disposed above a window structure 200. In FIG. 1, for example, the block 300 is coupled above a top edge 202 of a window structure 200. The block 300 can be fire resistant such that the block 300 will not catch fire or combust during a building fire. Since the block 300 does not catch fire or combust, it can help prevent, minimize, or reduce propagation of a building fire from the window structure 200 to (and/or vertically up) the wall (e.g., the exterior wall) of the building. In some embodiments, the block 300 may be placed above every window in a building to help prevent, minimize, or reduce propagation of a building fire.

The size and/or shape of the bock 300 can vary as desired. For example, as shown in FIG. 1, in some embodiments the length of the block 300 may extend beyond both lateral edges 204 and 206 of the window structure 200. In certain embodiments, the block 300 may have a length of at least 8 feet. However, the present disclosure is not so limited, and the length of the block 300 may be greater than or less than 8 feet. In some embodiments, the length of the block 300 may be dependent upon the length of the window structure 200 with which it may be used. As discussed previously, in some embodiments, the length of the block 300 may extend beyond the lateral edges 204 and 206 of the window structure 200. In other words, opposing edges of the block 300 may extend beyond opposing lateral edges 204 and 206 of the window structure 200. In other embodiments, the length of the block 300 may be the same length as the window structure 200. Stated another way, opposing edges of the block 300 may correspond with lateral edges 204 and 206 of the window structure 200.

The height and/or width (thickness) of the block 300 can also vary. In some embodiments, the height of the block 300 is less than about 18 inches, or less than about 12 inches. In other embodiments, the height of the block 300 is between about 2 inches and about 8 inches, or between about 4 inches and about 6 inches. In certain embodiments, the width (thickness) of the block 300 is less than about 18 inches, or less than about 12 inches. In other embodiments, the width (thickness) of the block 300 is between about 1 and about 6 inches. In particular embodiments, the width (thickness) of the block 300 is configured to be approximately the same width (thickness) as a wall panel 600 disposed above the block 300, such as the wall panels 600 discussed in relation to FIG. 5.

As further shown in FIG. 1, the wall system 100 may further include a wall covering 400. For example, the wall covering 400 may comprise bricks, stone, siding, stucco, etc. In the illustrated embodiment, for instance, a plurality of bricks are employed as the covering 400. The covering 400 may be coupled to other otherwise attached to the block 300. In particular embodiments, for example, the covering 400 is coupled to an outward facing surface of the block 300. Such a covering 400 can protect the block 300 from exposure to the elements. Such a covering 400 can also provide an aesthetic appearance to a building structure.

The covering 400 can be applied in various ways. In some embodiments, for example, the covering 400 (e.g., a plurality of bricks) is coupled to the block 300 with an adhesive material. Exemplary types of adhesive materials that can be used, include, but are not limited to, construction adhesives. The covering 400 can also be coupled to the block 300 with a fastener, such as a mechanical fastener. Other methods of attaching the covering 400 to the block 300 are also contemplated.

Figure 2A:
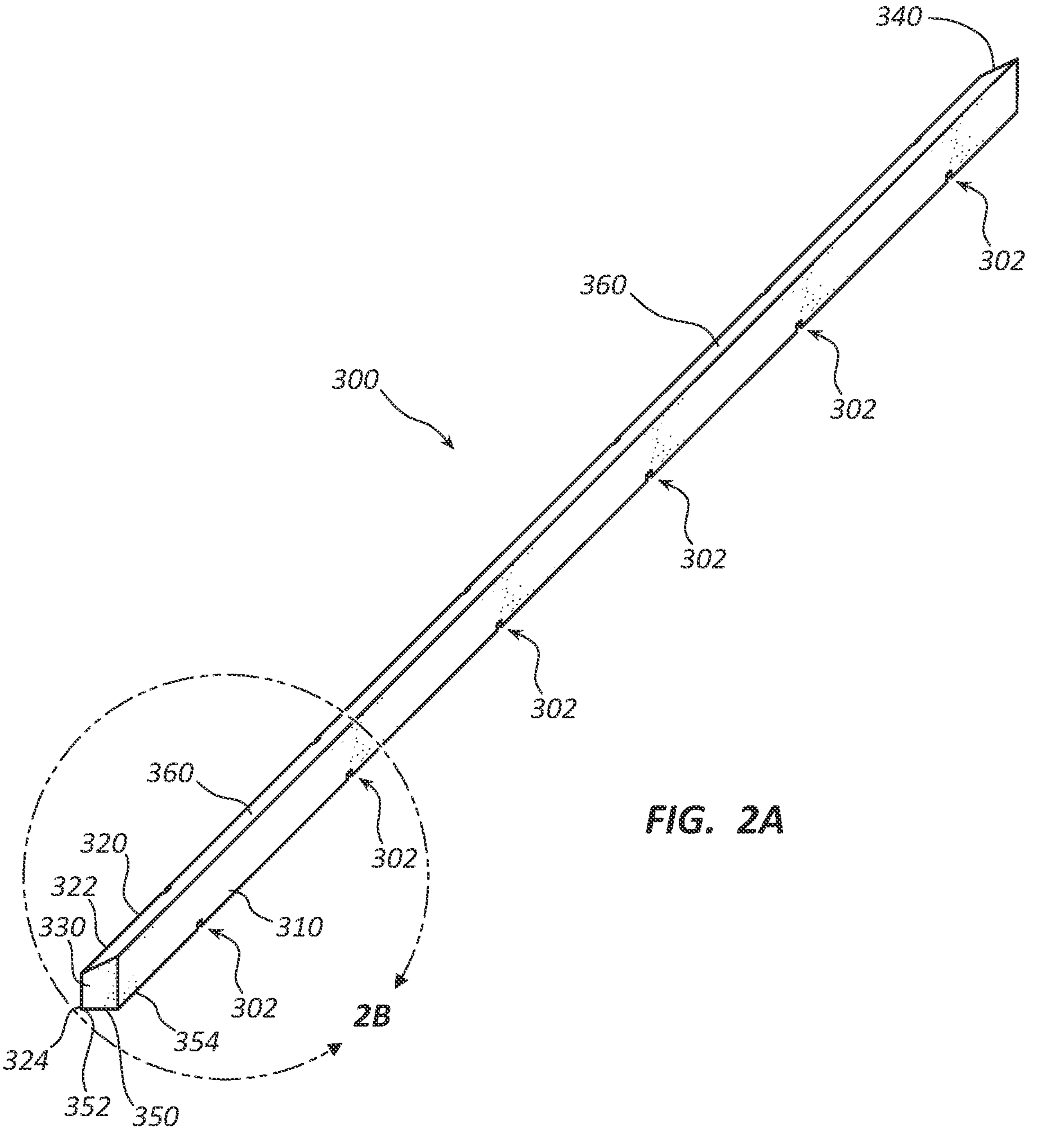
FIG. 2A is a top perspective view of the fire resistant construction block of the wall system of FIG. 1.
Figure 2B:
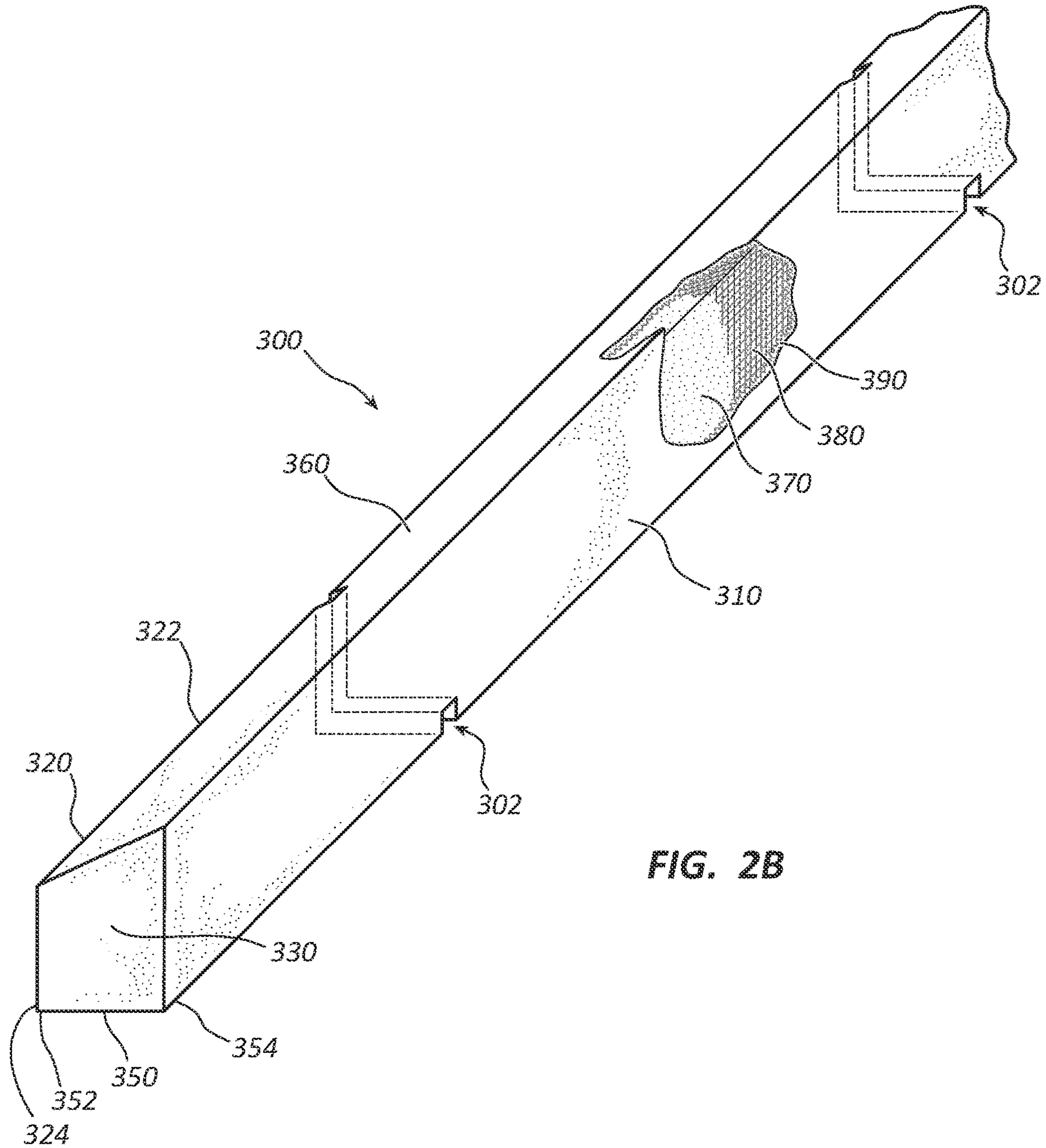
FIG. 2B is a detailed view of a portion of the fire resistant construction block of FIG. 2A.
Figure 3:
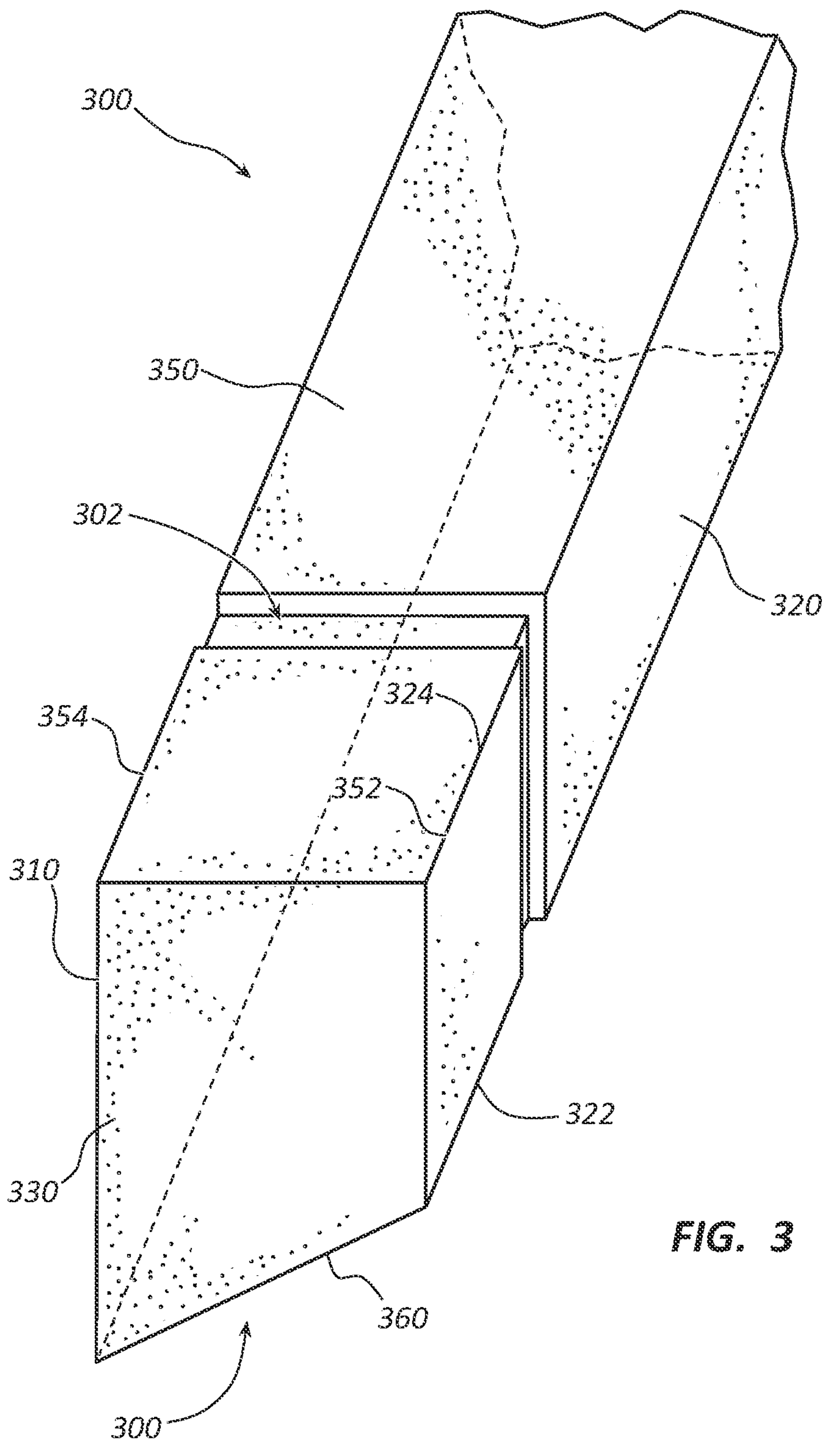
FIG. 3 is a bottom perspective view of a portion of the fire resistant construction block of FIGS. 2A and 2B.
Figure 4:
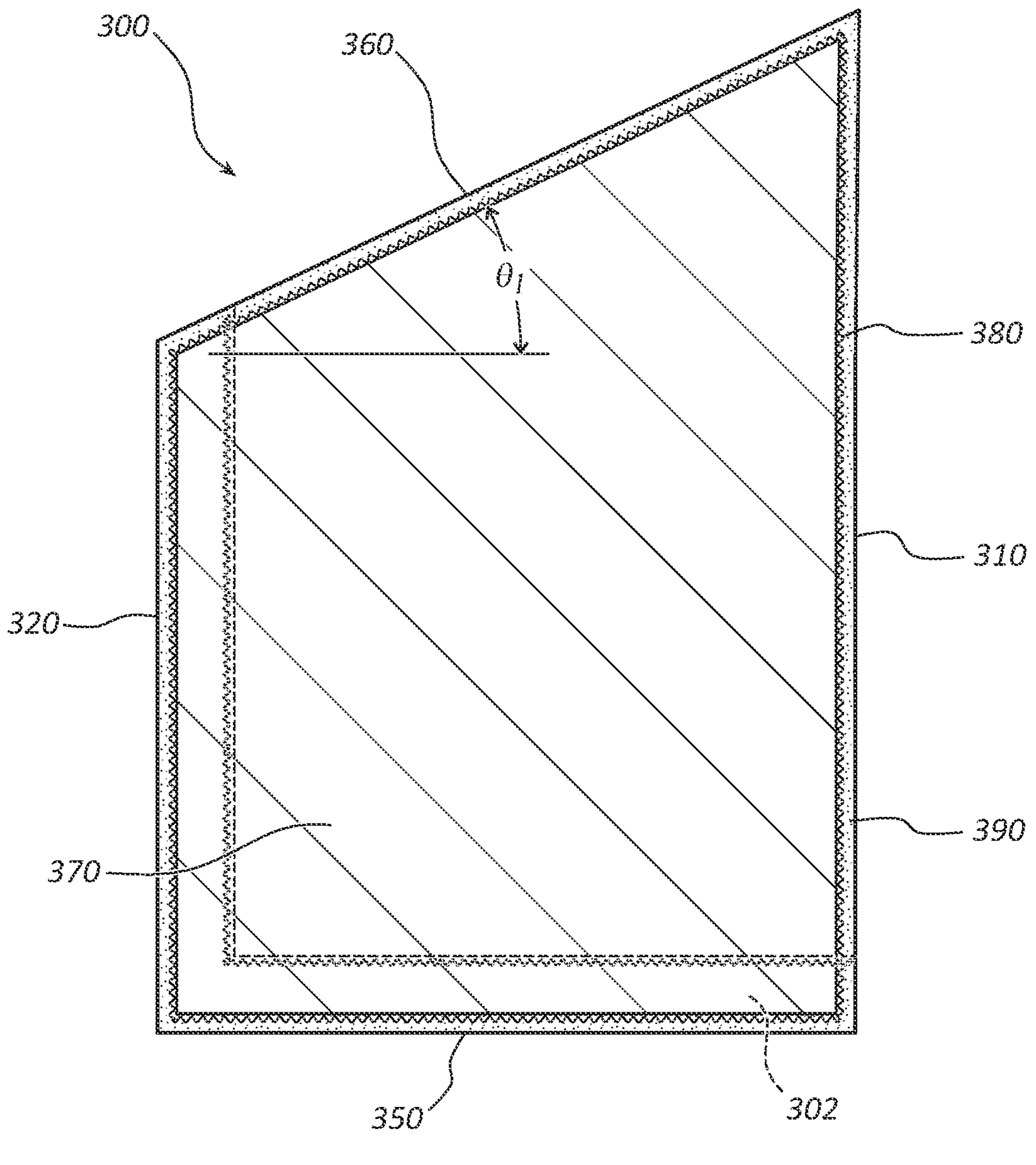
FIG. 4 is a side cross-sectional view of the fire resistant construction block of FIGS. 2A and 2B.

Various views of an embodiment of a block 300 are depicted in FIGS. 2A, 2B, 3, and 4. In particular, FIG. 2A illustrates a top perspective view of the block 300; FIG. 2B illustrates a detailed view of a portion of the block 300 of FIG. 2A; FIG. 3 illustrates a bottom perspective view of a portion of the block 300; and FIG. 4 illustrates a side cross-sectional view of the block 300. As shown therein, the block 300 may have a longitudinally elongate, polygonal shape. In certain embodiments, the block 300 can also be described as having a longitudinally elongate, trapezoidal or substantially trapezoidal shape. The block 300 also includes a front face 310, a rear face 320, a first side face (left face) 330, a second side face (right face) 340, a bottom face 350, and a top face 360.

As further shown in the illustrated embodiment, the top face 360 of the block 300 can comprise an angled or sloped surface. As detailed below, the angled or sloped surface can be configured to direct water towards the rear face 320 and/or channels 302 in the block 300. In particular embodiments, the top face 360 comprises a surface that is sloped at an angle θ. Without limitation, the angle θ may range from between about 10 degrees and about 80 degrees, between about 20 degrees and about 70 degrees, or between about 30 degrees and about 60 degrees.

The block 300 can also comprise various materials and/or layers. In some embodiments, the block 300 comprises a core 370. The core 370 can also comprise various materials. For example, in some embodiments, the core 370 comprises a polymeric material. Exemplary polymeric materials that can be used include, but are not limited to, polystyrene, polyisocyanurate, and polyvinyl alcohol. The polymeric material can also comprise a foam, such as an open cell or closed cell foam. The polymeric material can be molded, cut into shape, and/or extruded. In some embodiments, the core 370 comprises polystyrene. In certain embodiments, the polymeric material of the core 370 comprises a polystyrene foam. And in particular embodiments, the core 370 comprises an expanded polystyrene foam. In other embodiments, the core 370 comprises polyisocyanurate, or a polyisocyanurate foam. And in still other embodiments, the core 370 comprises polyvinyl alcohol, or a polyvinyl alcohol foam. The core 370 can also comprise other types of insulative materials.

FIG. 2B illustrates a breakaway view of the interior of the block 300 that illustrates the core 370. Additional layers are also depicted, including an optional intermediate layer 380 and a coating layer 390. In certain embodiments, an intermediate layer 380 is optionally applied over the core 370. For example, a mesh layer can be disposed as an intermediate layer 380 over the core 370. Various types of materials can be employed in this intermediate and/or mesh layer 380, including, but not limited to, fiberglass, metals, metal alloys, polymers, and combinations thereof. The intermediate or mesh layer 380 can help maintain the shape and/or structure of the block 300. The intermediate or mesh layer 380 can also aid in coupling a coating 390 to the core 370.

For example, in some embodiments, the block 300 comprises a fire resistant coating 390. The coating 390 can be disposed around a periphery of the core 370, and can cover at least a portion of, or the entire outer surface of the core 370. As shown in FIG. 2B, the intermediate or mesh layer 380 is disposed between the core 370 and the coating 390. In such embodiments, the intermediate or mesh layer 380 can help adhere or hold the coating 390 around the core 370. In other embodiments, no intermediate layer 380 is used, and the coating 390 is applied directly to the core 370. In some embodiments, the coating 370 (and/or optional intermediate layer 380) covers substantially all of the front face 310, rear face 320, bottom face 350, and top face 360 of the block 300. In further embodiments, the coating 370 (and/or optional intermediate layer 380) also covers substantially all of the first side face (left face) 330, and second side face (right face) 340 of the block 300. In other embodiments, the longitudinal end faces 330, 340 are not covered by the intermediate layer 380 and/or coating 370.

The coating 390 may comprise any suitable material that is fire resistant and/or can inhibit the block 300 from burning or combusting. In some embodiment, the fire resistant coating 390 is able to withstand temperatures required to satisfy the NFPA 285 Fire Test Standard and/or other fire test standards while maintaining its structural integrity. In certain embodiments, the coating 390 comprises a concrete, cement, or cementitious material. Other fire resistant materials can also be used, including, but not limited to, metals, polymers, and/or composite materials. The coating 390 can also be various thicknesses, such as less than 3 inches, 2 inches, or less than 1 inch. Other thicknesses, including greater thicknesses, can also be used.

The fire resistant coating 390 can also help the block 300 comply with the NFPA 285 standard fire test method and/or other fire test standards. For example, in some embodiments, the core 370 comprises a combustible material. Notwithstanding, the coating 390, which can comprise a fire resistant material, can inhibit or prevent the core 370 from combusting or burning. For instance, the coating 390 can inhibit or prevent oxygen from reaching the core 370, thereby inhibiting or preventing the core 370 from combusting and/or propagating a fire. In other embodiments, the coating 390 can minimize or reduce the combustibility of the core 370 and/or the block 300. In further embodiments, the core 370 comprises a material that is fire resistant, and the intermediate layer 380 and/or coating 390 are optional.

As shown in the illustrated embodiment, the block 300 may further include a plurality of channels or grooves 302. In other embodiments, the block 300 is devoid of channels 302. The channels 302 may have a sufficient enough depth to allow the passage of water through the channels 302. For example, in some embodiments, the depth of the channels 302 may be a quarter inch or more. In other embodiments, the depth of the channels 302 may be more or less than a quarter inch. The channels 302 may extend from a top edge 322 of the rear face 320 to a bottom edge 324 of the rear face 320. The channels 302 may further extend from a rear edge 352 of the bottom face 350 to the front edge 354 of the bottom face 350. The channels 302 may have a substantially U-shaped or substantially rectangular cross-section; however, the channels 302 may include other cross-sectional shapes, such as triangular, half-circle, polygonal, etc. The channels 302 may also have an arc-shaped groove. In FIG. 2B, the hidden portions of the channels 302 are illustrated in broken lines.

The channels 302 may be evenly spaced along the length of the block 300. In some embodiments, the channels 302 may be between about 6 and about 30 inches, between about 12 and about 24 inches, or between about 14 and about 18 inches apart. However, the present disclosure is not so limited and the channels 302 may be spaced more or less than 16 inches apart. In other embodiments, the channels 302 are not evenly spaced. For example, in certain embodiments, there may be a cluster of channels 302 close to each other, with other channels 302 spaced further away. In some embodiments, clusters of channels 302 may be disposed near the center of the block 300. In other embodiments, clusters of channels 302 may be disposed at opposing ends of the block 300.

FIG. 3 illustrates a bottom perspective view of a portion of the block 300. In particular, FIG. 3 illustrates the rear and bottom faces or surfaces 320, 350 of the block 300. FIG. 3 further depicts a channel 302, which extends continuously along the rear face 320 (e.g., from one edge 322 to another 324) and across the bottom face 350 (e.g., from one edge 352 to another 354) of the block 300. As previously discussed, when the block 300 is employed in a building structure, the channel 302 can be used to direct the flow of water around the block 300.

FIG. 4 illustrates a side cross-sectional view of the block 300. As shown in FIG. 4, the block 300 includes an upper surface 360 that is sloped at angle $\theta_1$ in relation to the rear surface 320. The slope of the upper surface 360 can direct the flow of water towards the rear surface 320, and/or towards the channels 302 in the rear surface 320.

As further shown in FIG. 4, the coating 390 can extend around or otherwise surround the perimeter or periphery of the core 370. An optional intermediate or mesh layer 380 is also depicted between the coating 390 and the core 370, and can also extend around all of, or a portion of the core 370. As previously discussed, the intermediate or mesh layer 380 can aid in coupling the coating 390 to the core 370.

It will be appreciated that the block 300 can be formed in various ways. For example, as previously discussed, in some embodiments the core 370 comprises a material (e.g., such as polystyrene) that is molded, cut into shape, and/or extruded into shape. The channels 302 can also be cut into or otherwise formed into the core 370. After forming the channels 302, an intermediate layer 380 can optionally be disposed around at least a portion of (or the entirety) of the core 370. The coating layer 390 can then be applied. For instance, the core structure 370 (with or without an intermediate layer 380) can be dipped into a mixture of the coating material to coat the core structure 370. In other embodiments, the coating material can be painted on, pasted on, or otherwise applied to the surfaces of the core structure 370. The coating material can thereafter dry or otherwise cure to solidify on the surface of the core structure 370.

Figure 5:
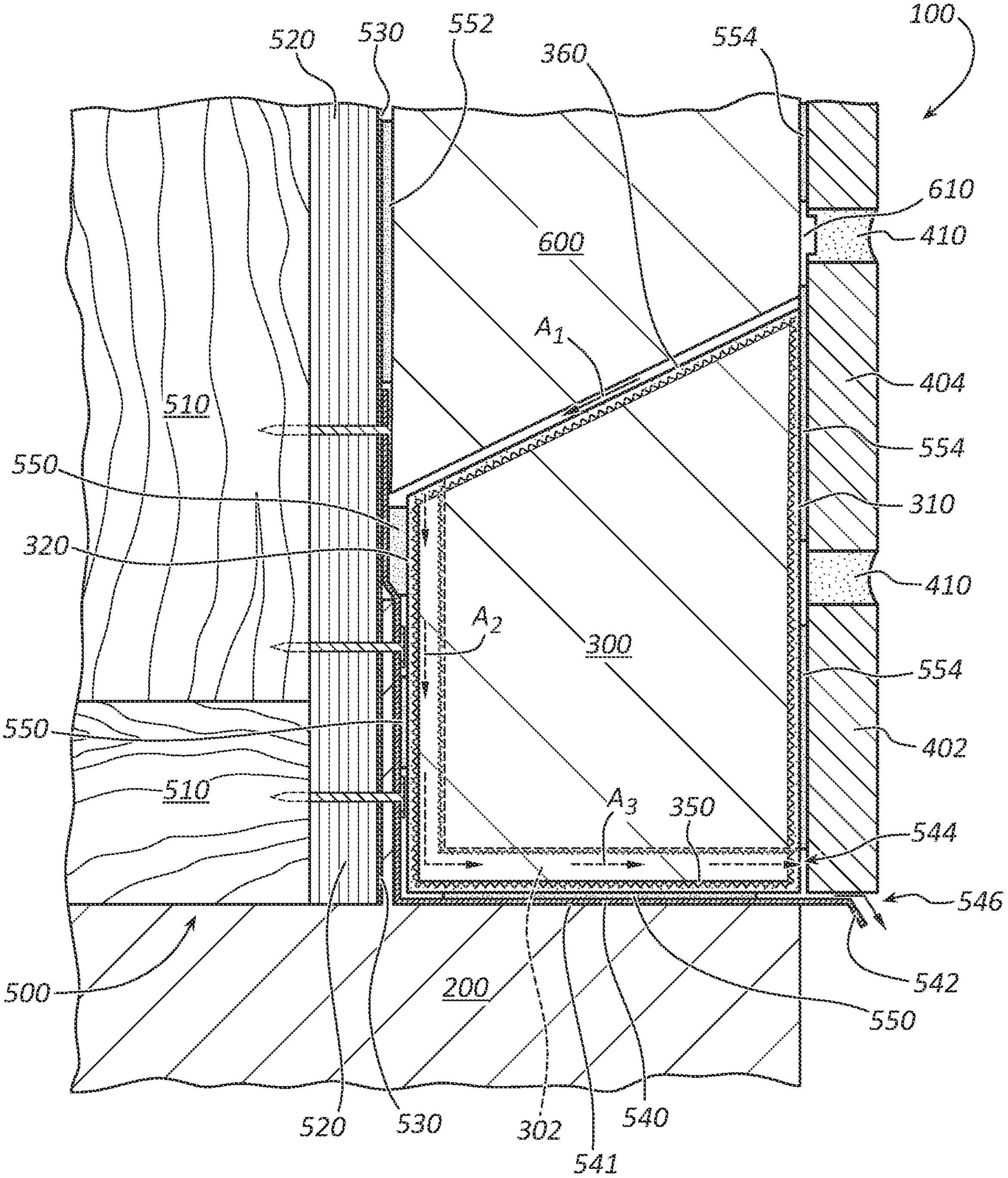
FIG. 5 is a side cross-sectional view of a wall system in accordance with another embodiment of the present disclosure.

FIG. 5 illustrates a cross-sectional view of the wall system 100 in accordance with another embodiment of the disclosure. The wall system 100 of FIG. 5 can be representative of a cross-sectional view taken from FIG. 1 across the view line 5-5. It will be appreciated, however, that the current disclosure is applicable to various types of wall structures 500, including those typically used in the building industry. Accordingly, while parts of the discussion are directed towards exterior wall structures 500, it will be appreciated that interior wall structures are also contemplated.

As shown in FIG. 5, the wall structure 500 can include various types of support structures, substrates, and other components 510, 520, 530. For example, in some embodiments, the wall structure 500 comprises one or more supports 510 that are coupled to a substrate or sheathing 520. The wall structure 500 can also comprise a weatherization barrier 530 that is optionally disposed on the substrate 520. A flashing structure 540 can also optionally be used.

With continued reference to FIG. 5, in the illustrated embodiment, the block 300 is coupled to the substrate 520.

A weatherization barrier 530 is also optionally disposed between the substrate 520 and the block 300. In certain embodiments, there may also be an open space or void disposed between the weatherization barrier 530 and the block 300, or between the substrate 520 and the block 300. As further shown in FIG. 5, the block 500 is also coupled to the wall structure 500 at a location that is above a window structure 200. A flashing structure 540 disposed between the block 300 and window structure 200 is also shown.

The block 300 can be coupled to the wall structure 500 (or a portion thereof, e.g., the substrate 520, flashing 540, etc.) in various ways. For example, in some embodiments, the block 300 is coupled to the wall structure 500 with an adhesive 550. Exemplary adhesives 550 that can be used include, but are not limited to, construction adhesives. Other methods of attaching the block 300 to the wall structure 500 are also within the scope of this disclosure, including, but not limited to, use of mechanical fasteners, etc. For example, one or more screws or nails may be used to couple block 300 to the wall structure 500. With reference to the illustrated embodiment, an adhesive 550 couples a rear face 320 and a bottom face 350 to a wall structure 500 and window structure 200, respectively.

In certain embodiments, one or more wall panels 600 may be also be used in connection with the systems disclosed herein. For instance, one or more wall panels 600 may also be coupled to the wall structure 500. In the illustrated embodiment, a wall panel 600 is coupled to the wall structure 500 at a location that is above the block 300. Exemplary wall panels 600 that can be used include polystyrene panels, such as the panels described in U.S. Pat. Nos. 6,516,578 and 7,121,051, each of which is incorporated by reference herein in its entirety.

In some embodiments, the wall panel 600 may be coupled to the wall structure 500 (or substrate 520) with an adhesive 552 (e.g., a construction adhesive). Other methods of coupling the panel 600 are within the scope of this disclosure, including, but not limited to, use of mechanical fasteners (e.g., nails, screws, etc.). In some embodiments, the panel 600 may be formed from the same material (e.g., polystyrene, polyisocyanurate, polyvinyl alcohol, etc.) as the core 370 of the block 300. In other embodiments, the panel 600 may comprise a different material from the core 370 of the block 300. In certain embodiments, the panel 600 may be fabricated from a polymeric material. And in particular embodiments, the panel 600 may be fabricated from at least one of a polystyrene foam (e.g., such as an expanded polystyrene foam), a polyisocyanurate foam, or a polyvinyl alcohol foam. Other types of materials, including insulative materials can also be used.

In certain embodiments, the wall panel 600 comprises a combustible material. In such embodiments, the block 300 may inhibit or prevent a fire from propagating (e.g., vertically propagating) along the wall panel 600. For instance, the block 300 may inhibit or prevent a flame from traveling upwards along the building structure 500. Further, in certain embodiments, a fire may cause at least a portion of the wall panel 600 to melt, without allowing the fire to propagate along the building. For example, at least a portion of the wall panel 600 may melt and flow along the top surface 360 and/or into the channels 302 of the block 300. In some instances, the melted material can block or inhibit oxygen from passing through the channels (e.g., from an area outside the wall to an intermediate wall area, such as behind a wall covering), which can reduce propagation of a fire. The fire may also be inhibited or prevented from traveling or propagating upwards along the building structure 500.

With continued reference to FIG. 5, in certain embodiments, a wall covering 400 may also be applied to the block 300 and the panel 600. For example, in the illustrated embodiment, the wall covering 400 comprises a plurality of bricks 402, 404. Other types of wall coverings 400 can be used, including, but not limited to, stones, siding, stucco, etc. In the illustrated embodiment, a height of the front face 310 of the block 300 may approximate a height of two bricks. In some embodiments, for example, the height of front face 310 of the block 300 may range between 3 inches and 7 inches. As further shown in FIG. 5, in certain embodiments, a first brick (or covering unit) 402 may be attached to a bottom portion of the front face 310 of the block 300 and a second brick (or covering unit) 404 may be attached to a top portion of the front face 310 of the block 300 and to a bottom portion of a panel 600. Coupling a brick or covering unit 404 to both the block 300 and panel 600 can add stability to the building structure 500.

As previously discussed, the wall covering 400 may be coupled to the block 300 and/or the panel 600 by an adhesive 554 (e.g., a construction adhesive). Other methods of attaching the wall covering 400 are also within the scope of this disclosure, such as use of mechanical fasteners, etc. The space or void between the bricks or covering units may also be filled with grout 410. In certain embodiments, the panel 600 may include a plurality of grooves or projections 610 that extend outward from a front face of the panel 600. The grooves or projections 610 may extend along the length of the panel 600 and provide a point of reference for a craftsman who adheres the covering 400 to the panel 600. The grooves or projections 610 can also be sized to fit a brick or covering unit. As illustrated in the FIG. 5, projections are disposed between adjacent vertical bricks or covering units.

In some embodiments, a flashing structure 540 may be optionally disposed between the block 300 and the window structure 200. The flashing structure 540 may extend outwards beyond the block 300 and the covering 400. The flashing structure 540 may further include a lip 542 that projects outward and downward. The block 300 may be attached to the flashing structure via the adhesive 550. Other methods of attaching the panel 600 are within the scope of this disclosure, such as use of mechanical fasteners, etc. The flashing structure 540 may have a sloped surface 541 (e.g., between about 1 and about 15 degrees, between about 1 and about 10 degrees, or between about 1 and about 5 degrees), and may direct the flow of water outwards and away from the building structure 500.

In some embodiments, the wall system 100 may also be configured to direct the flow of water around the block 300 and/or away from building structure 500. For example, water may penetrate the grout 410 or covering material, or may otherwise leak behind the wall covering 400. In such instances, the block 300 can be configured to direct the water toward the flashing 540 and eliminate the water through an opening 546 near the lip 542 of the flashing 540. In one embodiment, for example, the flow of water is directed (e.g., by gravitational forces) along the sloped surface 360 of the block 300 towards the rear face 320 and channels 302 of the block 320, as illustrated by arrow A1. When the water reaches a rear portion of the top face 360, the flow of water may enter the channels 302 and be directed downward as shown by the illustrated arrow A2. The water may then flow towards the opening 544 in the channel 302 of the bottom face 350 in the direction of the illustrated arrow A3. The flow of water is then expelled out of the exterior wall system 100 via an opening 546. As previously discussed, in the event of a building fire, the wall panel 600 can melt and flow into the channels 302, thereby blocking or inhibiting oxygen from passing through the channels 302.

Figure 6:
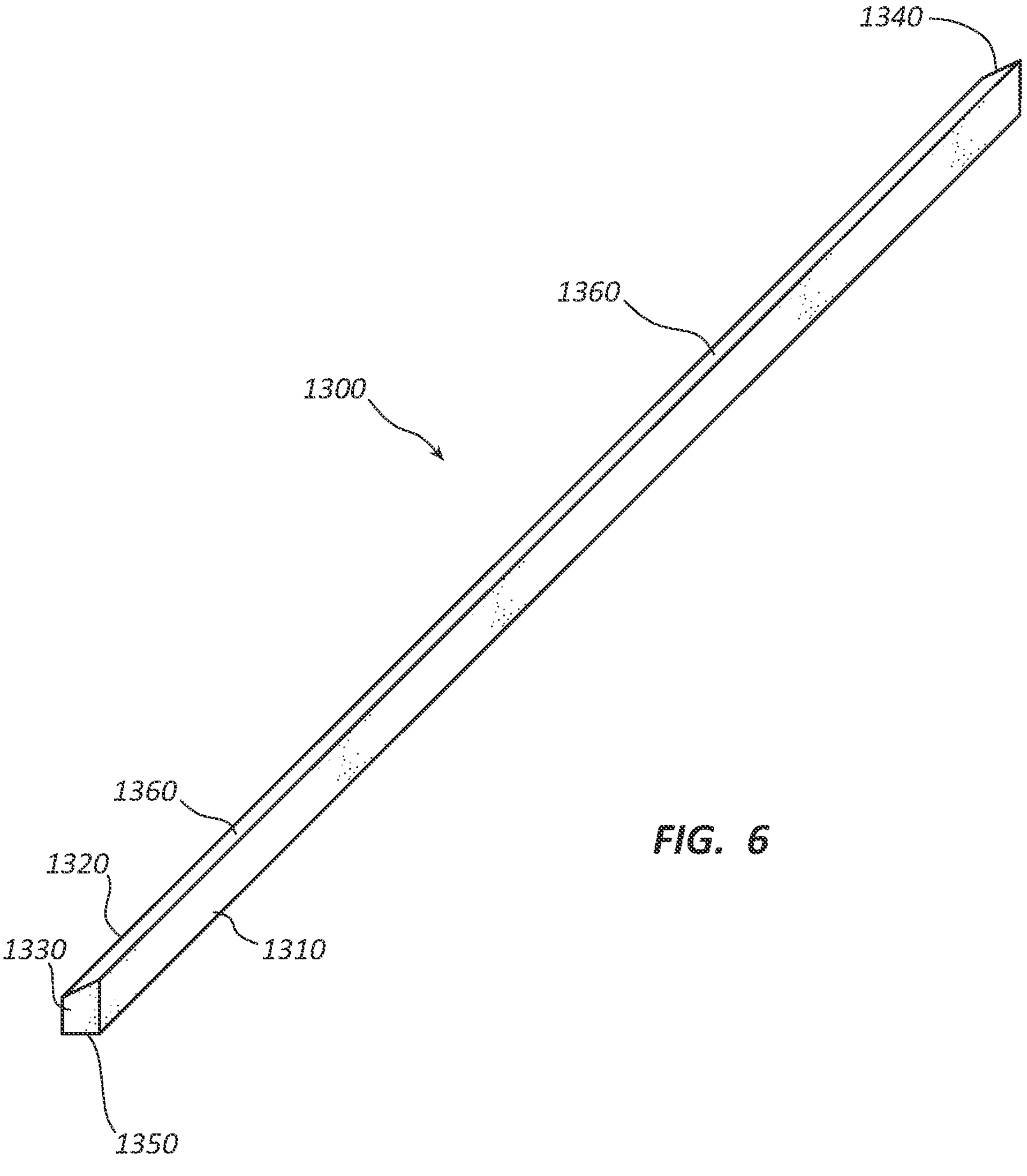
FIG. 6 is a top perspective view of a fire resistant construction block in accordance with another embodiment of the present disclosure.
Figure 7:
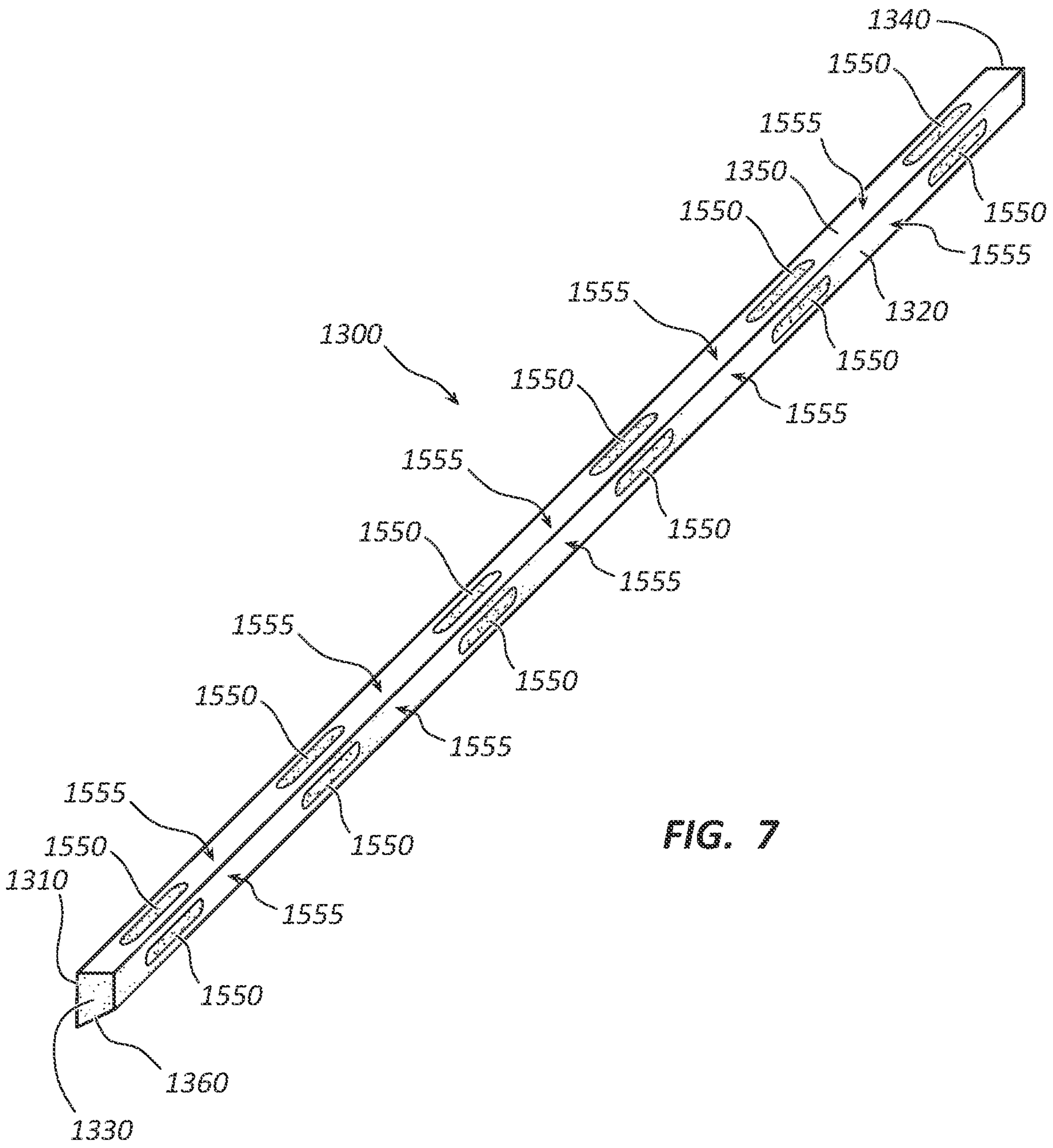
FIG. 7 is a bottom perspective view of the fire resistant construction block of FIG. 6.
Figure 8:
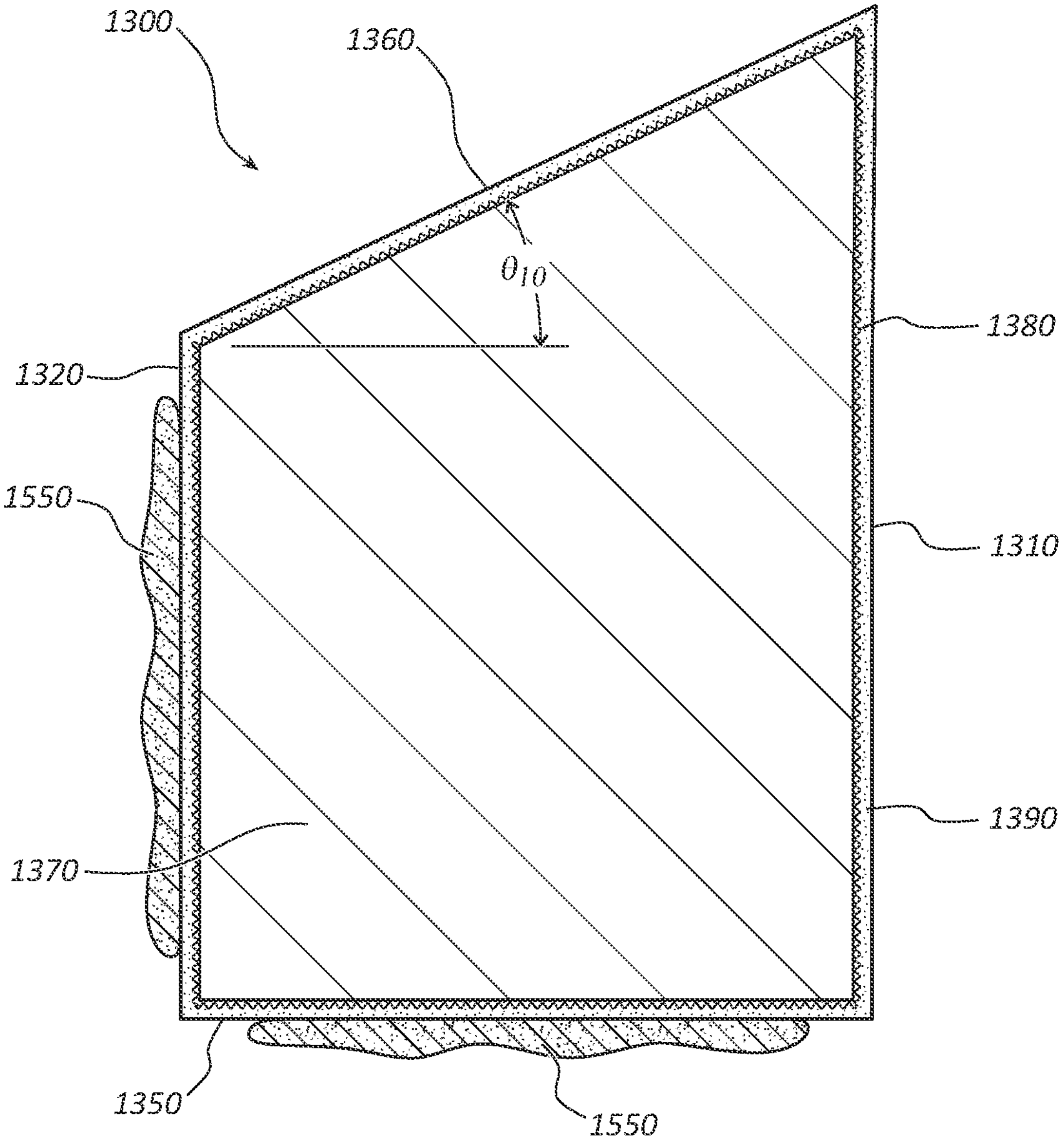
FIG. 8 is a side cross-sectional view of the fire resistant construction block of FIG. 6.

FIGS. 6-8 illustrate a fire resistant construction block 1300 in accordance with another embodiment of the present disclosure. The fire resistant construction block 1300 can, in certain respects, resemble the fire resistant construction block 300 described above in FIGS. 2-4. Accordingly, like features are designated with like reference numerals, with the leading digits incremented to “13” rather than “3.” Relevant disclosure set forth above regarding similarly identified features thus may not be repeated hereafter. Moreover, specific features of the fire resistant construction block 1300 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the fire resistant construction block 1300. Any suitable combination of the features and variations of the same described with respect to the fire resistant construction block 300 can be employed with the fire resistant construction block 1300, and vice versa. This pattern of disclosure applies equally to further embodiments depicted in subsequent figures and described hereafter, wherein the leading digits may be further incremented.

Various views of the embodiment of the block 1300 are depicted in FIGS. 6-8. In particular, FIG. 6 illustrates a top perspective view of the block 1300; FIG. 7 illustrates a bottom perspective view of the block 1300; and FIG. 8 illustrates a side cross-sectional view of the block 1300. As shown therein, the block 1300 may have a longitudinally elongate, polygonal shape. In certain embodiments, the block 1300 can also be described as having a longitudinally elongate, trapezoidal or substantially trapezoidal shape. The block 1300 also includes a front face 1310, a rear face 1320, a first side face (left face) 1330, a second side face (right face) 1340, a bottom face 1350, and a top face 1360.

As further shown in the illustrated embodiment, the top face 1360 of the block 1300 can comprise an angled or sloped surface. As previously discussed, the angled or sloped surface can be configured to direct water towards the rear face 1320 of the block 1300. In particular embodiments, the top face 1360 comprises a surface that is sloped at an angle $\theta_{10}$. Without limitation, the angle $\theta_{10}$ may range from between about 10 degrees and about 80 degrees, between about 20 degrees and about 70 degrees, or between about 30 degrees and about 60 degrees.

As previously discussed, the block 1300 can comprise various materials and/or layers. For example, the block 1300 comprises a core 1370. The block 1300 also optionally comprises an intermediate layer 1380 and/or a coating layer 1390.

In contrast to the block 300 of FIGS. 2-4, the block 1300 of FIGS. 6-8 is devoid of channels along its rear face 1320 and bottom face 1350. In such embodiments, the flow of water can be directed through gaps 1555 in the adhesive 1550 used to couple the block 300 to a building structure. For instance, as shown in FIG. 7, adhesive 1550 can be disposed discontinuously along the rear face 1320 and bottom face 1350 such that one or more gaps 1555 are formed between regions of the adhesive 1550.

The gaps 1555 may be evenly spaced along the length of the block 1300. In some embodiments, the gaps 1555 may be between about 6 and about 30 inches, between about 12 and about 24 inches, or between about 14 and about 18 inches apart. However, the present disclosure is not so limited and the gaps 1555 may be spaced more or less than 16 inches apart. In other embodiments, the gaps 1555 are not evenly spaced. For example, in certain embodiments, there may be a cluster of gaps 1555 close to each other, with other gaps 1555 spaced further away. In some embodiments, clusters of gaps 1555 may be disposed near the center of the block 1300. In other embodiments, clusters of gaps 1555 may be disposed at opposing ends of the block 1300.

FIG. 8 illustrates a side cross-sectional view of the block 1300. As shown in FIG. 8, the block 1300 includes an upper surface 1360 that is sloped at angle $\theta_{10}$ in relation to the rear surface 1320. The slope of the upper surface 1360 can direct the flow of water towards the rear surface 1320. Regions of adhesive 1550 are also shown disposed on the rear surface 1320 and bottom surface 1350. As can be appreciated, the regions of adhesive 1550 create a space between the rear and bottom surfaces 1320, 1350 and the building structure to which the block 1300 would be coupled. Gaps 1555 formed between adhesive regions 1550 can thus allow water to flow from the upper surface 1360, down the rear surface 1320, and along the bottom surface 1350.

Figure 9:
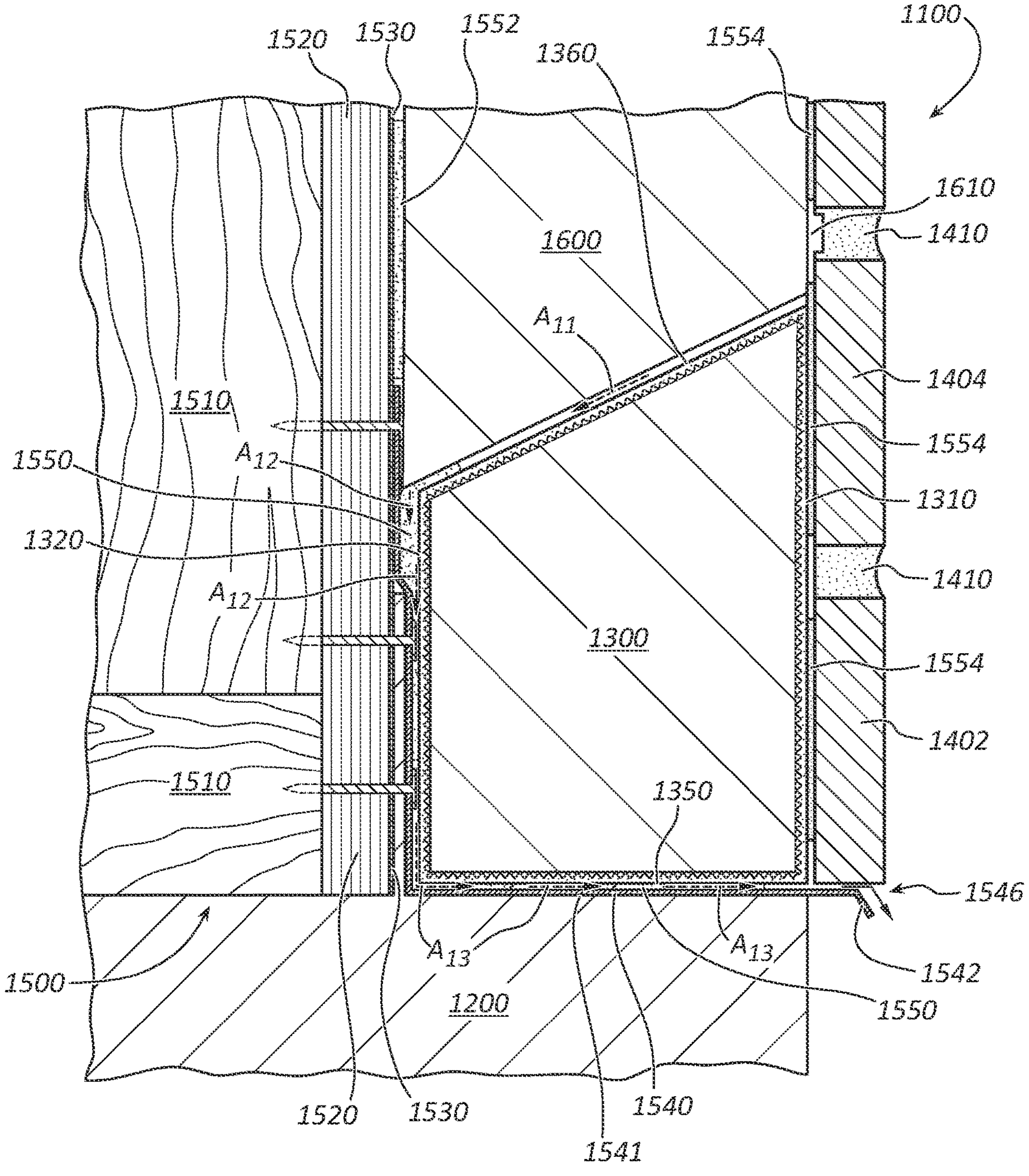
FIG. 9 is a side cross-sectional view of a wall system in accordance with another embodiment of the present disclosure.

FIG. 9 illustrates a cross-sectional view of the wall system 1100 in accordance with another embodiment of the disclosure. The wall system 1100 of FIG. 9 can be representative of a cross-sectional view taken from FIG. 1 across the view line 5-5. It will be appreciated, however, that the current disclosure is applicable to various types of wall structures 1500, including those typically used in the building industry. Accordingly, while parts of the discussion are directed towards exterior wall structures 1500, it will be appreciated that interior wall structures are also contemplated.

As shown in FIG. 9, the wall structure 1500 can include various types of support structures, substrates, and other components 1510, 1520, 1530. For example, in some embodiments, the wall structure 1500 comprises one or more supports 1510 that are coupled to a substrate or sheathing 1520. The wall structure 1500 can also comprise a weatherization barrier 1530 that is optionally disposed on the substrate 1520. A flashing structure 1540 can also optionally be used.

With continued reference to FIG. 9, in the illustrated embodiment, the block 1300 is coupled to the substrate 1520. A weatherization barrier 1530 is also optionally disposed between the substrate 1520 and the block 1300. In certain embodiments, there may also be an open space or void disposed between the weatherization barrier 1530 and the block 1300, or between the substrate 1520 and the block 1300. As further shown in FIG. 9, the block 1300 is also coupled to the wall structure 1500 at a location that is above a window structure 1200. A flashing structure 1540 disposed between the block 1300 and window structure 1200 is also shown.

The block 1300 can be coupled to the wall structure 1500 (or a portion thereof, e.g., the substrate 1520, flashing 1540, etc.) in various ways. For example, in some embodiments, the block 1300 is coupled to the wall structure 1500 with an adhesive 1550. Exemplary adhesives 1550 that can be used include, but are not limited to, construction adhesives. Other methods of attaching the block 1300 to the wall structure 1500 are also within the scope of this disclosure, including, but not limited to, use of mechanical fasteners, etc. For example, one or more screws or nails may be used to couple block 1300 to the wall structure 1500. With reference to the illustrated embodiment, an adhesive 1550 couples a rear face 1320 and a bottom face 1350 to a wall structure 1500 and window structure 1200, respectively. As discussed in relation to FIG. 7, the adhesive 1550 can be applied to the rear face 1320 and bottom face 1350 of the block 1300 discontinuously. In such embodiments, one or more gaps 1555 may be formed which can allow for the passage of water between the block 1300 and the building and/or window structures 1500, 1200.

In certain embodiments, one or more wall panels 1600 may be also be used in connection with the systems disclosed herein. For instance, one or more wall panels 1600 may also be coupled to the wall structure 1500. In the illustrated embodiment, a wall panel 1600 is coupled to the wall structure 1500 at a location that is above the block 1300. Exemplary wall panels 1600 that can be used include polystyrene panels, such as the panels described in U.S. Pat. Nos. 6,516,578 and 7,121,051, each of which is incorporated by reference herein in its entirety.

In some embodiments, the wall panel 1600 may be coupled to the wall structure 1500 (or substrate 1520) with an adhesive 1552 (e.g., a construction adhesive). Other methods of coupling the panel 1600 are within the scope of this disclosure, including, but not limited to, use of mechanical fasteners (e.g., nails, screws, etc.). In some embodiments, the panel 1600 may be formed from the same material (e.g., polystyrene, polyisocyanurate, polyvinyl alcohol, etc.) as the core 1370 of the block 1300. In other embodiments, the panel 1600 may comprise a different material from the core 1370 of the block 1300. In certain embodiments, the panel 1600 may be fabricated from a polymeric material. And in particular embodiments, the panel 1600 may be fabricated from at least one of a polystyrene foam (e.g., such as an expanded polystyrene foam), a polyisocyanurate foam, or a polyvinyl alcohol foam. Other types of materials, including insulative materials can also be used.

In certain embodiments, the wall panel 1600 comprises a combustible material. In such embodiments, the block 1300 may inhibit or prevent a fire from propagating (e.g., vertically propagating) along the wall panel 1600. For instance, the block 1300 may inhibit or prevent a flame from traveling upwards along the building structure 1500. Further, in certain embodiments, a fire may cause at least a portion of the wall panel 1600 to melt, without allowing the fire to propagate along the building. For example, at least a portion of the wall panel 1600 may melt and flow along the top surface 1360 and/or into gaps 1555 disposed along portions of the rear face 1320 and/or bottom face 1350 of the block 1300. In some instance, the melted material can block or inhibit oxygen from passing through the gaps 1555 (e.g., from an area outside the wall to an intermediate wall area, such as behind a wall covering), which can reduce propagation of a fire. The fire may also be inhibited or prevented from traveling or propagating upwards along the building structure 1500.

With continued reference to FIG. 9, in certain embodiments, a wall covering 1400 may also be applied to the block 1300 and the panel 1600. For example, in the illustrated embodiment, the wall covering 1400 comprises a plurality of bricks 1402, 1404. A height of the front face 1310 of the block 1300 may approximate a height of two bricks. In some embodiments, for example, the height of front face 1310 of the block 1300 may range between 3 inches and 7 inches. As further shown in FIG. 9, in certain embodiments, a first brick (or covering unit) 1402 may be attached to a bottom portion of the front face 1310 of the block 1300 and a second brick (or covering unit) 1404 may be attached to a top portion of the front face 1310 of the block 1300 and to a bottom portion of a panel 1600. Coupling a brick or covering unit 1404 to both the block 1300 and panel 1600 can add stability to the building structure 1500.

As previously discussed, the wall covering 1400 may be coupled to the block 1300 and/or the panel 1600 by an adhesive 1554 (e.g., a construction adhesive). Other methods of attaching the covering 1400 are also within the scope of this disclosure, such as use of mechanical fasteners, etc. The space or void between the bricks or covering units may also be filled with grout 1410. In certain embodiments, the panel 1600 may include a plurality of grooves or projections 1610 that extend outward from a front face of the panel 1600. The grooves or projections 1610 may extend along the length of the panel 1600 and provide a point of reference for a craftsman who adheres the covering 1400 to the panel 1600. The grooves or projections 1610 can also be sized to fit a brick or covering unit. As illustrated in the FIG. 9, projections are disposed between adjacent vertical bricks or covering units.

In some embodiments, a flashing structure 1540 may be optionally disposed between the block 1300 and the window structure 1200. The flashing structure 1540 may extend outwards beyond the block 1300 and the covering 1400. The flashing structure 1540 may further include a lip 1542 that projects outward and downward. The block 1300 may be attached to the flashing structure via the adhesive 1550. Other methods of attaching the panel 1600 are within the scope of this disclosure, such as use of mechanical fasteners, etc. The flashing structure 1540 may have a sloped surface 541 (e.g., between about 1 and about 15 degrees, between about 1 and about 10 degrees, or between about 1 and about 5 degrees), and may direct the flow of water outwards and away from the building structure 1500.

In some embodiments, the wall system 1100 may also be configured to direct the flow of water around the block 1300 and/or away from building structure 1500. For example, water may penetrate the grout 1410 or covering material, or may otherwise leak behind the covering 1400. In such instances, the block 1300 can be configured to direct the water toward the flashing 1540 and eliminate the water through an opening 1546 near the lip 1542 of the flashing. In one embodiment, for example, the flow of water is directed (e.g., by gravitational forces) along the sloped surface 1360 of the block 1300 towards the rear face 1320 and into gaps 1555 disposed between regions of adhesive 1550 on the block 1300, as illustrated by arrow A11. When the water reaches a rear portion of the top face 1360, the flow of water may enter the gaps 1555 disposed between regions of adhesive 1550 and be directed downward as shown by the illustrated arrow A12. The water may then flow through gaps 1555 disposed between regions of adhesive 1550 on the bottom face 1350 and towards the opening 1546 as illustrated by arrow A13. The flow of water is then expelled out of the exterior wall system 1100 via the opening 1546. As previously discussed, in the event of a building fire, the wall panel 1600 can melt and flow into the gaps 1555, thereby blocking or inhibiting oxygen from passing through the gaps 1555.

Methods of using the fire resistant construction blocks are also disclosed herein. In particular, it is contemplated that any of the components, principles, and/or embodiments discussed above may be utilized in either a fire resistant construction block, system, or a method of using the same. An illustrative method of using a fire resistant construction block can include a step of coupling or attaching a fire resistant construction block to a substrate of a building. In some embodiments, the block is coupled above a window structure. The method can also include a step of coupling or attaching a wall panel to the substrate of the building. The method can further include a step of coupling a covering (e.g., a brick covering) to the front face of the construction block and/or a front face of the panel. Other method steps are also contemplated.

EXAMPLES

To further illustrate the embodiments disclosed herein, the following examples are provided. These examples are illustrative and not intended to limit the scope of the claims in any way.

Example 1

A wall system incorporating a fire resistant construction block as disclosed herein was created and evaluated in accordance with the NFPA Code 285 standard fire test. The fire resistant construction block included a polystyrene foam, an intermediate fiberglass mesh layer, and a coating comprising a cementitious material (similar to the fire resistant construction block of FIGS. 2A, 2B, 3, and 4). The fire resistant construction block was disposed above a window opening and adhered to the wall structure using a construction adhesive.

A polystyrene foam wall panel was adhered to the wall structure above the fire resistant construction block. Brick and mortar were then applied over the polystyrene foam panel and the fire resistant construction block to form the wall system (similar to the wall system of FIG. 5).

A window burner was then positioned in the center of the window opening and the NFPA 285 fire test methods were applied, with the burners on for 30 minutes. The results of the test were as follows: 1) flames did not reach 10 feet above the opening header; 2) flames did not reach a lateral distance of 5 feet from the vertical centerline; 3) flames did not propagate beyond the limits of the first story test room; 4) no visible flaming in the second story test room; 5) select thermocouples did not exceed their 1000° F. limit. In conclusion, the wall system incorporating the fire resistant construction block met the conditions of acceptance as outlined in the NFPA 285 standard fire test.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

The invention claimed is:

1. A wall system, comprising:

a fire resistant construction element disposed above a window, the fire resistant construction element comprising:

a front face, a rear face, a bottom face, and a top face, wherein the top face comprises a sloped surface;

a panel disposed above the fire resistant construction element; and a covering attached to at least one of the front face of the fire resistant construction element or a front face of the panel.

2. The wall system of claim 1, wherein the fire resistant construction element comprises a plurality of channels that extend vertically in the rear face of the fire resistant construction element and horizontally in the bottom face of the fire resistant construction element.

3. The wall system of claim 1, further comprising a flashing disposed between the window and the fire resistant construction element.

4. The wall system of claim 1, wherein a length of the fire resistant construction element corresponds with a length of the window and opposing edges of the fire resistant construction element correspond with opposing edges of the window.

5. The wall system of claim 1, wherein a length of the fire resistant construction element exceeds a length of the window and opposing edges of the fire resistant construction element extend beyond opposing edges of the window.

6. The wall system of claim 1, wherein the covering further comprises a plurality of wall coverings that are attached to the front face of the fire resistant construction element and the front face of the panel.

7. The wall system of claim 1, wherein the fire resistant construction element comprises a fire resistant outer surface.

8. The wall system of claim 1, wherein placement of the fire resistant construction element enables an exterior wall of a building to comply with at least one of National Fire Protection Agency Code 285 standard fire test method (2018) or National Fire Protection Agency Code 285 standard fire test method (2019).

9. The wall system of claim 1, wherein an adhesive is disposed discontinuously along the rear face of the fire resistant construction element to create one or more gaps between regions of the adhesive on the rear face of the fire resistant construction element.

10. The wall system of claim 9, wherein the adhesive is further disposed discontinuously along the bottom face of the fire resistant construction element to create one or more gaps between regions of the adhesive on the bottom face of the fire resistant construction element.

11. A method of attaching a wall system to a building, comprising:

attaching a fire resistant construction element to a substrate of the building above a window of the building, the fire resistant construction element comprising:

a front face, a rear face, a bottom face, and a top face, wherein the top face comprises a sloped surface;

attaching a panel to the substrate of the building above the fire resistant construction element; and attaching a covering to at least one of the fire resistant construction element or the panel.

12. The method of claim 11, wherein the fire resistant construction element comprises a plurality of channels that extend vertically in the rear face of the fire resistant construction element and horizontally in the bottom face of the fire resistant construction element.

13. The method of claim 11, further comprising a flashing disposed between the window and the fire resistant construction element.

14. The method of claim 11, wherein a length of the fire resistant construction element corresponds with a length of the window and opposing edges of the fire resistant construction element correspond with opposing edges of the window.

15. The method of claim 11, wherein a length of the fire resistant construction element exceeds a length of the window and opposing edges of the fire resistant construction element extend beyond opposing edges of the window.

16. The method of claim 11, wherein the covering further comprises a plurality of wall coverings that are attached to the front face of the fire resistant construction element and a front face of the panel.

17. The method of claim 11, wherein the fire resistant construction element comprises a fire resistant outer surface.

18. The method of claim 11, wherein placement of the fire resistant construction element enables an exterior wall of the building to comply with at least one of National Fire Protection Agency Code 285 standard fire test method (2018) or National Fire Protection Agency Code 285 standard fire test method (2019).

19. The method of claim 11, wherein an adhesive is disposed discontinuously along the rear face of the fire resistant construction element to create one or more gaps between regions of the adhesive on the rear face of the fire resistant construction element.

20. The method of claim 19, wherein the adhesive is further disposed discontinuously along the bottom face of the fire resistant construction element to create one or more gaps between regions of the adhesive on the bottom face of the fire resistant construction element.

* * * * *